Patented Aug. 29, 1944

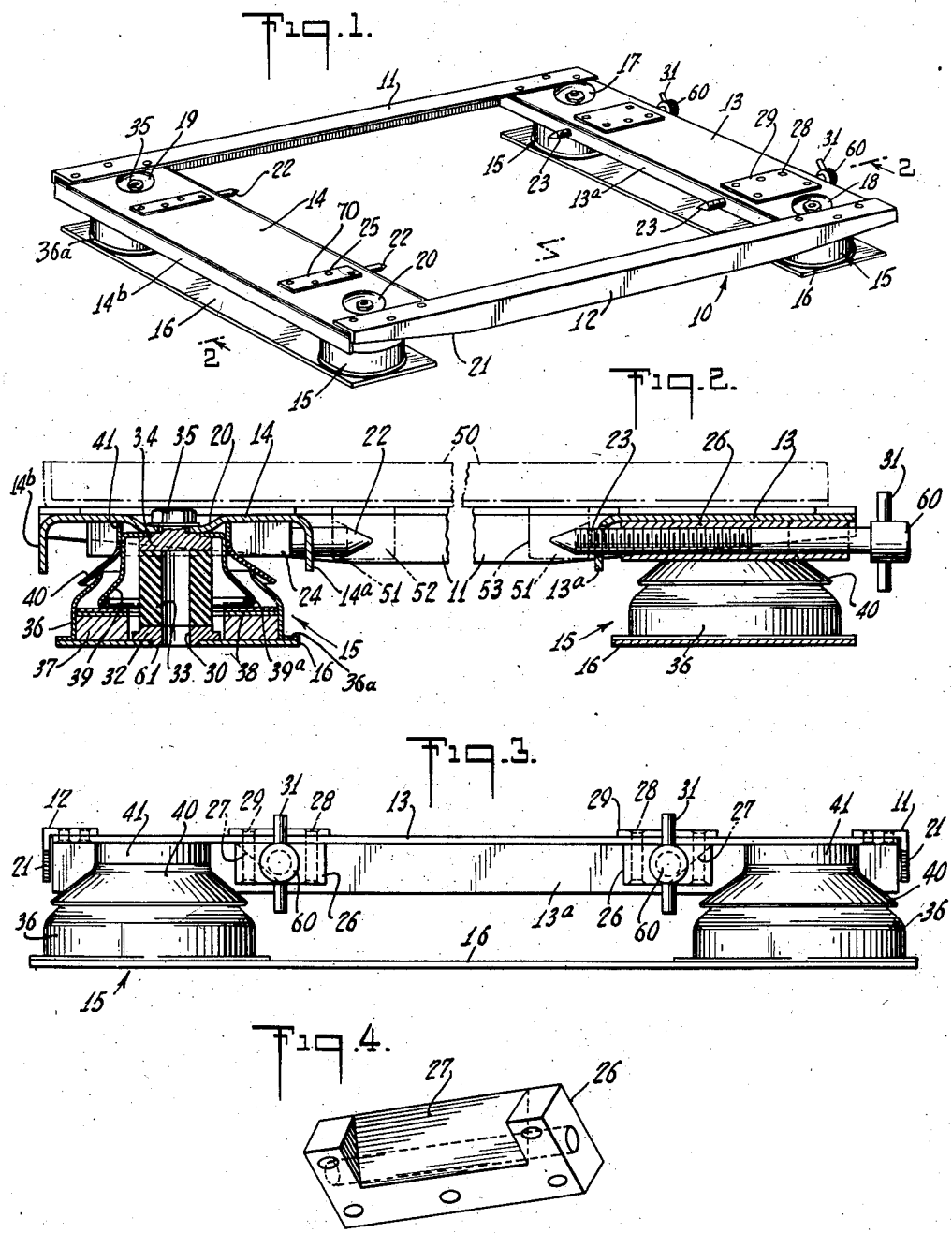

2,357,120

UNITED STATES PATENT OFFICE 2,357,120

SHOCK ABSORBING SUPPORTING DEVICE

Edward J. Kuebert, Bellmore, and Joseph P. Della Corte, Brooklyn, N. Y., assignors to Fairchild Camera and Instrument Corporation, a corporation of Delaware Application May 20, 1941, Serial No. 394,248

9 Claims. (Cl. 248—22)

This invention relates to mounting apparatus for absorbing shocks and vibration which would otherwise be impressed upon the device supported by the mounting apparatus.

Various types of navigating instruments, such as a radio compass, for example, adapted for use on aircraft, are often characterized by delicate or finely adjusted parts which are apt to fracture or get out of adjustment by reason of shocks or vibration transmitted to the instrument. Conventional shock mounts for such instruments are inefficient for their intended purpose, especially so where the weight of the instrument is unsymmetrically distributed, its center of gravity high and not necessarily centrally located, and its base of small dimension in comparison with its height. Furthermore, such shock mounts are often impractical for use on aircraft because of space limitations on the aircraft. Still further, such mounts are usually of such a character that it is difficult not only to attach the instrument thereto, but also difficult to detach the instrument therefrom. It is accordingly among the objects of this invention to provide a shock mount which is simple and rugged in construction, and yet well able to securely support a navigating instrument in a restricted space in such a manner that shocks and vibration are not transmitted to the instrument.

The invention accordingly consists in the features of construction, combinations of elements, and arrangements of parts as will be exemplified in the structure to be hereinafter described, and the scope of the application of which will be indicated in the following claims.

In the drawing, wherein there is shown one embodiment of our invention,

Figure 1 is an isometric view of our shock mount;

Figure 2 is an enlarged section taken along the line 2—2 of Figure 1 and showing the base of an instrument secured to the shock mount;

Figure 3 is an enlarged elevation of the shock mount as viewed from the right-hand end of Figure 1; and, Figure 4 is an isometric view of a portion of our shock mount.

Similar reference characters refer to similar parts throughout the several views of the drawing.

Referring first to Figure 1, our shock mount is generally indicated at 10 and comprises in general a frame made up of a pair of side angles 11 and 12 secured at their ends to front and rear plates 13 and 14, respectively. To each of plates 13 and 14 are secured a pair of retainer and foot assemblies, such as the assembly generally indicated at 15. Each associated pair of assemblies is secured to a mounting or tie plate, such as plate 16, which in turn is adapted to be secured to that part of the aircraft on which shock mount 10 is positioned. Thus side angles 11 and 12 and front and rear plates 13 and 14, form a frame on which the instrument 50 indicated in dotted lines in Figure 2, is secured in a manner which will be described in detail hereinbelow.

As shown in Figure 2, front plate 13 is preferably L-shaped in cross section, and accordingly includes one side flange 13a, preferably facing to the rear of the shock mount, this flange being provided to stiffen the plate. Plate 13 has a pair of depressions 17 and 18 (Figure 1) for a purpose described below. Rear plate 14 (Figure 2) is preferably channel-shaped in cross section and accordingly has front and rear flanges 14a and 14b which provide the requisite stiffness. Rear plate 14 also has depressions 19 and 20 (Figure 1) formed therein. Side angles 11 and 12 (Figure 1) are made from angle stock for stiffness and rigidity and are preferably flush riveted to plates 13 and 14. Preferably the ends of side angles 11 and 12 are tapered as at 21 on side angle 12, to provide ample clearance with respect to assemblies 15.

Still referring to Figure 1, rear plate 14 has secured thereto a pair of cone points 22, front plate 13 having a pair of pointed release screws 23 adjustably mounted thereon. As shown in Figure 2, each of cone points 22 is preferably integral with and extends from a block 24 flush riveted to rear plate 14 by rivets 25 which extend through a retainer plate 70. Each of release screws 23 (Figure 2) is threaded and rotatably mounted in a block 26. As shown in Figure 4, block 26 has a section 27 milled therefrom so that the block when secured in proper place on front plate 13, as by rivets 28 extending through a retainer plate 29, amply clears the adjacent foot assembly 15.

The outer end of screw 23 is provided with a head 60 through which a pin 61 extends to facilitate adjustment of the screw. Each of screws 23 is aligned with the cone point 22 lying opposite. The pointed ends of these cone points and release screws are adapted to fit into cone-shaped holes 51 formed on rear and front cross bars 52 and 53 secured to instrument 50 supported by shock mount 10. It will thus appear that through the adjustment provided by release screws 23, wear of cone-shaped holes 51 in the front cross bar 53, or wear of the ends of release screws 23 can never result in an improper or dangerous condition, as the release screws may be turned to take up any play that may exist between the shock mount and the instrument. Hence, at all times a tight connection between the instrument and shock mount is assured. This is particularly advantageous in view of the fact that many navigating and other instruments, such as are commonly used on modern aircraft, have high centers of gravity and accordingly are not highly stable.

As noted hereinabove, front and rear plates 13 and 14 each has secured thereto a pair of foot assemblies 15. As these assemblies are all alike, only one will be described. As shown in Figure 2, foot assembly 15 includes a metal ring or washer 30 having a neck 61 and a shoulder 32 formed thereon. Neck 61 fits into a counterbored hole in plate 16 and its lower end is spun over to secure washer 30 to plate 16. Resting on and suitably secured to metal ring or washer 30 is a resilient member 33, preferably a rubber tube, to the upper end of which is secured an upper washer 34 underlying rear plate 14. Upper washer 34 has a threaded stud extending therefrom through a hole in rear plate 14 and this stud carries a nut 35 which when taken up, clamps rear plate 14 against the top of washer 34.

Concentric with cushion 33 is an outer retainer 36 having a flange 36a which may be riveted to plate 16 or secured thereto in any suitable manner. Outer retainer 36 surrounds an annular rubber pad 37 on the top of which rests one or more friction discs 38. An inner retainer 39 has a flared rim 39a which rests on the top of the upper of friction discs 38, while the top of retainer 39 is staked to washer 34 under rear plate 14. Preferably we cement a dust cap 40 to the periphery of inner retainer 39 to prevent foreign particles entering assembly 15 between the walls of outer and inner retainers 36 and 39. To hold dust cap 40 in proper position, a spacer 41 is also cemented to the upper part of inner retainer 39, and the upper edge of spacer 41 bears against the bottom of rear plate 14, thus effectively sealing the entire assembly. It will now appear that substantial horizontal relative movement between tie plate 16 and rear plate 14, for example, can be accommodated through the resilience of foot assembly 15, and accordingly the foot assemblies absorb vibrations and shocks imparted thereto by tie plates 16 and do not transmit such shocks or vibration to front and rear plates 13 and 14, and accordingly to the instrument.

Shocks or vibration exerted laterally of foot assembly 15 might cause undue relative movement between tie plate 16 and rear plate 14, for example, were it not for the damping action of the rim 39a of inner retainer 39. This flared rim 39a as noted above, is pressed against the top of upper friction disc 38 by the weight of the instrument on the shock mount and accordingly resists such relative movement between plates 14 and 16, and this resistance dampens the relative movement and accordingly avoids excessive displacement of the instrument from its normal position. It should also be noted that the diameter of the flared portion of inner retainer 39 is substantially greater than the upper end of outer retainer 36 so as to preclude parting of foot assembly 15 if rubber cushion 33 fails by reason of the instrument base 50 and shock mount becoming suddenly inverted, such as might well happen as where the instrument is installed on an airplane.

It will now appear that we have provided a shock mount which practicably and and efficiently attains the several objects hereinabove set forth.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

We claim:

1. In apparatus of the character described, a frame comprising front and back plates permanently secured together by spaced side bars, a pair of mounting elements secured to said rear plate, a pair of adjustable mounting elements movably mounted on said front plate, said elements lying below the plane of said plates and bars and adapted to secure an instrument or the like within said frame, a plurality of tie plates, and vibration absorbing means for securing each of said tie plates to said frame.

2. In apparatus of the character described, a metal frame including spaced front and rear plates, a pair of stationary cone points secured to said rear plate in spaced relation, a pair of movable cone points secured to said front plate in spaced relation and movable toward and away from said stationary cone points for releasably securing to said frame an instrument or the like, a mounting member associated with each of said plates, and vibration absorbing means for securing each of said mounting members to said plates.

3. In apparatus of the character described, an upper supporting element, a lower supporting element, vibration absorbing means secured to said elements and disposed therebetween, an inverted cup-shaped member secured to said upper element, and a friction element disposed between said lower element and the rim of said cup-shaped member and in engagement with said rim to resist movement of said rim thereover.

4. In apparatus of the character described, an upper plate, a lower plate, vibration absorbing means secured to said plates and lying therebetween and adapted to absorb vibration shocks exerted laterally of said means, a vibration absorbing member secured to one of said plates, and a member secured to the other of said plates for transmitting vibration shocks exerted axially of said means to said vibration absorbing member.

5. In apparatus of the character described, an upper plate, a lower plate, a metal disc secured to said upper plate, a metal disc secured to said lower plate, a rubber tubular element disposed between said discs and having its opposite ends secured respectively thereto, an annular rubber cushion on said lower plate and surrounding said rubber element, a friction disc on said cushion, an outer retainer secured to said bottom plate and surrounding said cushion and at least a portion of said element, an inner retainer secured to said upper disc and surrounding at least a portion of said element and lying within the upper portion of said outer retainer, said inner retainer having a lower rim resting on said friction disc to dampen lateral movement of said element, said cushion adapted to absorb vibration shocks transferred thereto by said inner retainer, and a dust excluding member secured to one of said retainers and engaging the other.

6. In apparatus of the character described, a metal frame including spaced front and rear plates, a pair of spaced stationary cone points secured to said rear plate, a pair of spaced movable cone points secured to said front plate and movable toward and away from said stationary cone points for releasably securing to said frame an instrument or the like, all of said cone points being disposed below the plane of said plates, mounting means associated with said plates, and vibration absorbing means for securing said mounting means to said plates.

7. In apparatus of the character described, an upper plate, a lower plate, a washer secured to each of said plates, a vibration absorbing member disposed between said washers and directly secured thereto, an upper retainer secured to said upper plate and extending downwardly therefrom about said vibration absorbing member and in spaced relation thereto, a lower retainer secured to said bottom plate and extending upwardly therefrom about said vibration absorbing member and said upper retainer and in spaced relation thereto, and a second vibration absorbing member secured to said lower plate and surrounding said first vibration absorbing member and one of said washers and engaging said upper retainer to absorb vibration exerted downwardly thereby.

8. In apparatus of the character described, an upper plate, a lower plate, a washer secured to each of said plates, a vibration absorbing member disposed between said washers and directly secured thereto, an upper retainer secured to said upper plate and extending downwardly therefrom about said vibration absorbing member and in spaced relation thereto, a lower retainer secured to said bottom plate and extending upwardly therefrom about said vibration absorbing member and said upper retainer and in spaced relation thereto, a second vibration absorbing member secured to said lower plate and surrounding said first vibration absorbing member and one of said washers and engaging said upper retainer to absorb vibration exerted downwardly thereby, and means bridging the space between said retainers to exclude the entrance of foreign particles therebetween.

9. In apparatus of the character described, in combination, an upper plate, a lower plate, a rubber vibration absorbing member disposed between said plates and secured thereto, an upper retainer secured to said upper plate and extending downwardly therefrom about said rubber member and in spaced relation thereto, a second rubber vibration absorbing member secured to said lower plate and surrounding said first rubber member and engaging the lower edge of said upper retainer to absorb vibration exerted downwardly thereby, and a lower retainer secured to said bottom plate and surrounding both of said rubber members and a portion of said upper retainer, said retainers being spaced.

EDWARD J. KUEBERT.
JOSEPH P. DELLA CORTE.